United States Patent [19]
Bailey

[11] Patent Number: 5,967,836
[45] Date of Patent: Oct. 19, 1999

[54] SWIVEL ELECTRICAL RECEPTACLE

[76] Inventor: Ronald I. Bailey, 6123 S. Yorktown, Tulsa, Okla. 74137

[21] Appl. No.: 08/883,484

[22] Filed: Jun. 26, 1997

[51] Int. Cl.[6] .................................................... H01R 13/73
[52] U.S. Cl. ............................................ 439/534; 439/248
[58] Field of Search .............................. 439/31, 160, 536, 439/534, 535, 131

[56] References Cited

U.S. PATENT DOCUMENTS

| | | |
|---|---|---|
| 1,873,042 | 8/1932 | Rohrdanz . |
| 3,609,647 | 9/1971 | Castellano ................................ 339/122 |
| 3,622,684 | 11/1971 | Press ...................................... 439/131 |
| 4,850,886 | 7/1989 | Berke ...................................... 439/152 |
| 5,249,970 | 10/1993 | Jennings ................................... 439/31 |
| 5,462,452 | 10/1995 | Devine ..................................... 439/505 |

*Primary Examiner*—Paula Bradley
*Assistant Examiner*—Briggitte R. Hammond
*Attorney, Agent, or Firm*—Molly D. McKay

[57] ABSTRACT

An electrical outlet provided with a face for removably receiving electrical plugs such that the face is capable of swiveling left and right in response to a tug thereon by an attached electrical plug. The outlet is provided with a swivel portion capable of swiveling relative to an electrical box which secures the outlet to a building wall and relative to a faceplate which attaches to the electrical box. The face for removably receiving electrical plugs is located on a front side of the swivel portion and is accessibly via a central opening in the faceplate. A rear side of the swivel portion provides a flexible electrical connection to an electrical house wire in order to supply power to the outlet.

4 Claims, 4 Drawing Sheets

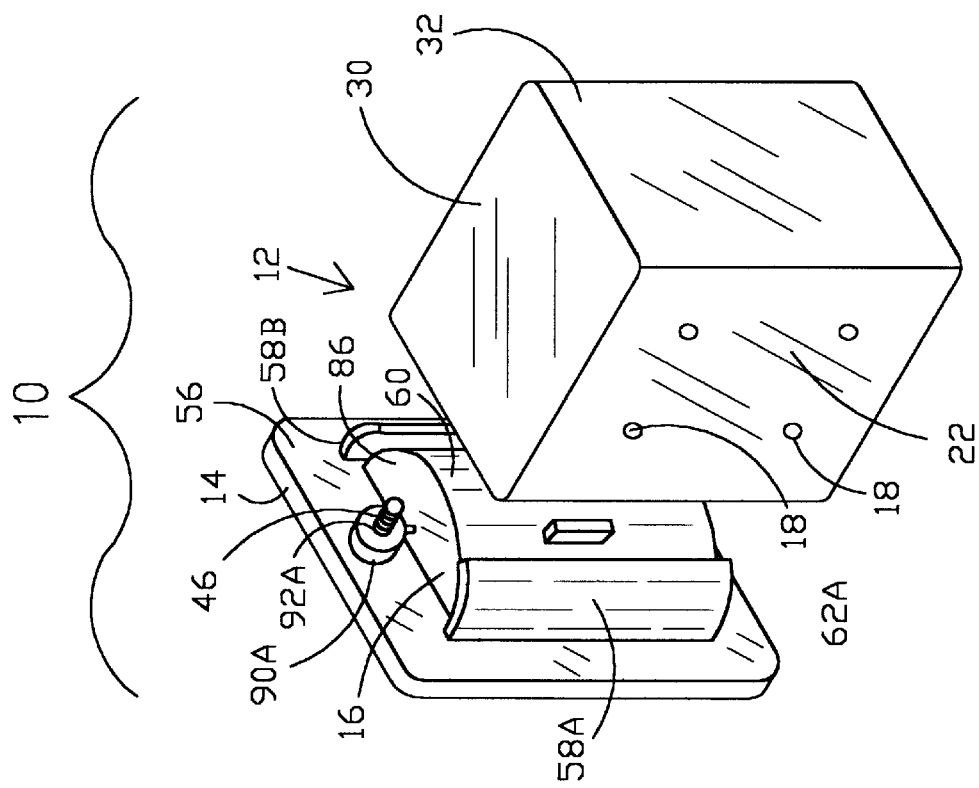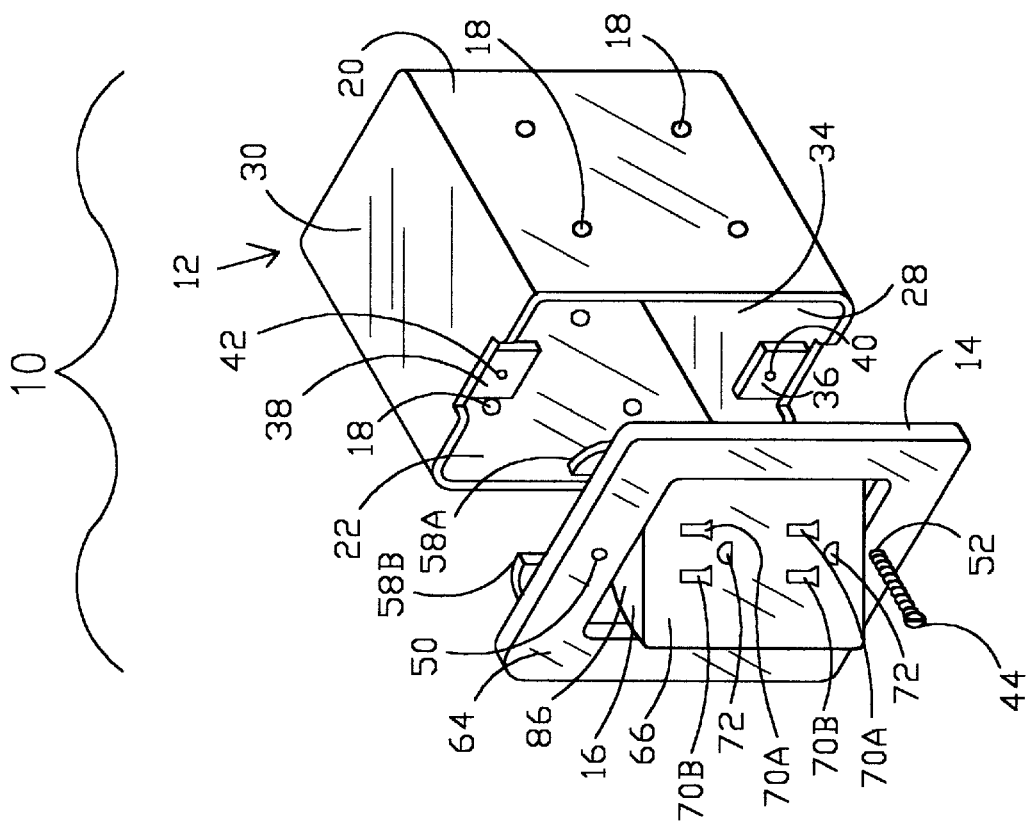

SWIVEL ELECTRICAL RECEPTACLE

BACKGROUND OF THE INVENTION

1. Field of the Invention

The present invention relates to a new type of electrical receptacle for installation within a wall of a building. The receptacle is capable of swiveling along a vertical axis, allowing the receptacle face to move left or right in response to a pulling force exerted thereon by an attached electrical plug as the electrical plug is pulled on by its attached electrical cord.

2. Description of the Related Art

Employers of power equipment operators are required by the Occupational Safety and Health Administration (OSHA) to have their electrical equipment properly grounded. This requires operative grounded electrical receptacles and grounded electrical plugs for engaging the grounded electrical receptacles. For example professional office janitorial services, which vacuum carpeted office floors on a nightly basis, must frequently replace the electrical plugs on their vacuum cleaners. The reason the electrical plugs require frequent replacement is that employees using the equipment simply jerk on the electrical cord to disengage the electrical plug from the electrical receptacles in the office being cleaned. Unless the pulling force on the electrical cord is perpendicular to the face of the electrical receptacle, the rigid ground prong provided on the plug can be damaged by being bent, or alternately, can be snapped off when the plug is pulled out of the rigidly fixed electrical receptacle. Once the ground prong on the plug is thus damaged, the plug can no longer be used and must be replaced with a new plug. Although the two blade prongs provided on the plugs are also normally bent as a result of this pulling force, since they are somewhat flexible, they generally do not break when so bent and normally can be bent back into shape by the user so that the plug can subsequently be reinserted into another electrical receptacle. Also, the electrical receptacle can also be damaged when the plug is jerked out of engagement with the receptacle.

Although employees are advised not to jerk on the electrical cords to disengage the plugs, the problem continues because it is more convenient for the employees to disengage the plugs using this procedure. The ground plug may also be bent or broken accidentally and the receptacle may be damaged when the equipment operator attempts to go beyond the reach of the power cord.

Most of the solutions which have been proposed in order to address this problem employ some modification of the plug, such as a swivel provided on the plug or an extra length of easily disengagable cord employed between the electrical receptacle and the equipment plug. Although these proposed devices may provide some improvement in the incidence of damage to plugs and receptacles, they do not provide totally satisfactory solutions. The reason is that none of the proposed devices address the fundamental problem of having a pulling force exerted on a plug such that the pulling force is not perpendicular to the face of the electrical receptacle. More simply stated, the fundamental problem is that the prongs of the plug are not being pulled straight outward from the openings in the electrical receptacle in which they are removably engaged.

The present invention seeks to address the fundamental problem by providing an electrical receptacle capable of swivelling along a vertical axis in response to a pulling force applied directly on an engaged electrical plug or applied indirectly on an electrical cord attached to an engaged electrical plug. The present invention allows the face of the electrical receptacle to swivel, and thus, to align itself perpendicularly with the pulling force exerted on the engaged plug.

SUMMARY OF THE INVENTION

The present invention is a swivel electrical receptacle comprised of an electrical box, a swivel portion and a faceplate. The electrical box secures via fasteners inserted through fastener opening provided in both side walls of the electrical box to a structural member in a building wall.

The electrical box is provided with a bottom wall and an opposite, parallel, space apart top wall, such that the bottom and top walls are perpendicular to the two parallel, space apart side walls. A back wall secures to and is perpendicular to each of the side walls, the top wall and the bottom wall, forming a 5-sided box with a front opening provided opposite the back wall.

The top wall is provided with a downwardly extending tab adjacent the front opening, and the bottom wall is provided with an upwardly extending tab adjacent the front opening. Each tab is provided with a threaded opening for receiving respectively a top faceplate screw and a bottom faceplate screw.

The faceplate is provided with a large central opening capable of movably receiving and providing access to a face of the swivel portion. An upper hole for receiving the top faceplate screw is provided centrally in the faceplate above the central opening, and a lower hole for receiving the bottom faceplate screw is provided centrally in the faceplate below the central opening.

The swivel portion swivels on a vertical axis located adjacent to a reverse side of the faceplate. The reverse side of the faceplate is also provided with a pair of arcuate wings which extend rearward from the faceplate and concentrically surround an arcuate rear side of the swivel portion. Stops provided on the arcuate rear side removably engage the wings to limit rotation of the swivel portion, thus keeping flexible wire extending out of the arcuate rear side from becoming dam aged.

One end of the flexible wire is electrically connected internally within the swivel portion to slots and prong opening which are provided in the face of the swivel portion in order to removably receive blades and ground prongs of an electrical plug. An opposite end of the flexible wire is electrically connected to an electrical house wire via suitable wire connectors. The electrical box is provided with wire holes therein which allow the electrical house wire to enter the electrical box where it is connected to the flexible wire.

The swivel portion is provided with a top surface and an opposite bottom surface. Each of the top and bottom surfaces is provided with a rod receiving opening. A first end of a rod movably inserts into each rod receiving opening. Each rod has with an opposite end which is provided with an eye opening. The top faceplate screw inserts from a front side of the faceplate consecutively though the upper hole in the faceplate, through the eye of the rod which is inserted into the rod receiving opening provided on the top surface of the swivel portion and into the threaded opening provided in the downwardly extending tab in order to rotatably secure the swivel portion between the faceplate and the electrical box.

Likewise, the bottom faceplate screw inserts from the front side of the faceplate consecutively through the lower hole in the faceplate, through the eye of the rod which is inserted into the rod receiving opening provided on the bottom surface of the swivel portion and into the threaded opening provided in the upwardly extending tab in order to rotatably secure the swivel portion between the faceplate and the electrical box.

BRIEF DESCRIPTION OF THE DRAWINGS

FIG. 1 is a front perspective view of a swivel electrical receptacle constructed in accordance with a preferred embodiment of the present invention, showing the faceplate and swivel portion disengaged from an associated electrical box.

FIG. 3 is a rear perspective view of the swivel electrical receptacle of FIG. 1.

DETAILED DESCRIPTION OF THE PREFERRED EMBODIMENT

Figure 2:
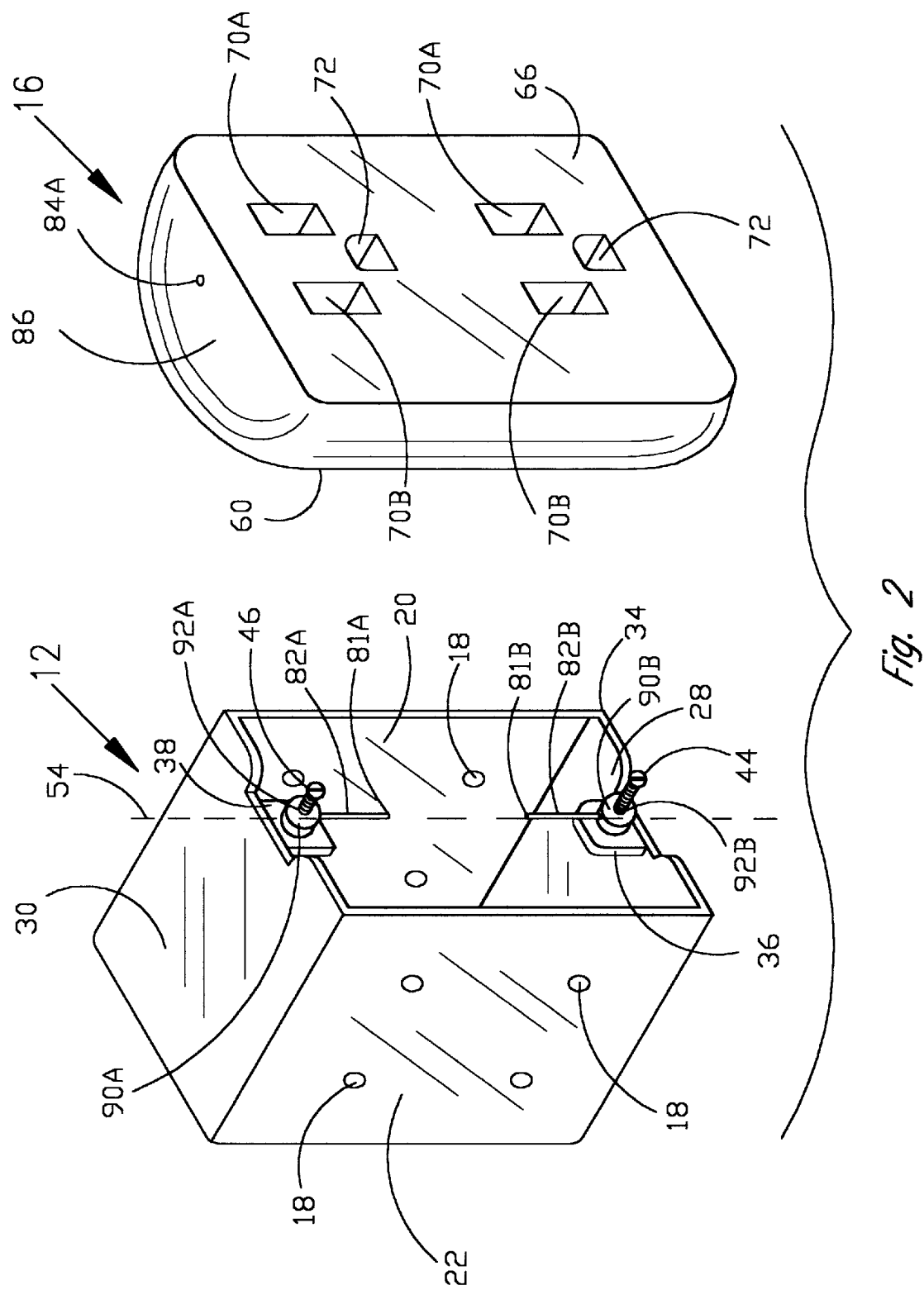
FIG. 2 is an exploded view of the swivel electrical receptacle of FIG. 1, shown with the faceplate removed.

Referring now to the drawings, and initially to FIG. 1 and FIG. 3, there is illustrated a swivel electrical receptacle 10 constructed in accordance with a preferred embodiment of the present invention. The receptacle 10 is comprised of an electrical box 12, a faceplate 14 and a swivel portion 16.

Figure 5:
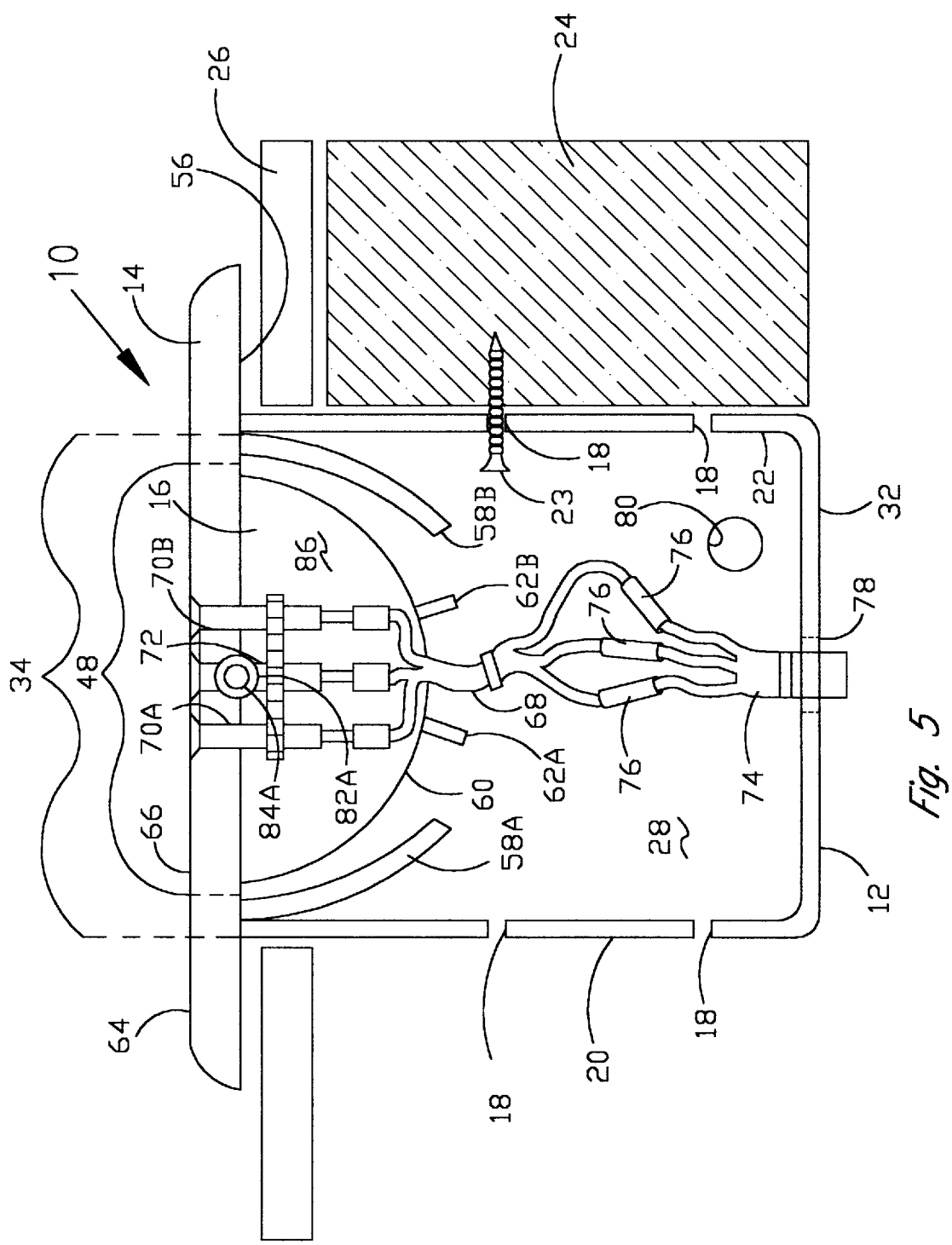
FIG. 5 is a top plan view of the swivel electrical receptacle of FIG. 1 shown with the top wall cut away, installed in a wall and connected to an electrical house wire.

Referring now also to FIG. 5, the electrical box 12 is provided with fastener openings 18 extending through each side wall 20 and 22 of the electrical box 12. Fasteners 23, such as screws, nails or other suitable fastening means, insert through the fastener openings 18 in order to secure the electrical box 12 to a structural member 24, such as a wooden stud, provided within a building wall 26.

The electrical box 12 is also provided with a bottom wall 28, and opposite top wall 30, and a back wall 32. The side walls 20 and 22 are approximately parallel and spaced apart from each other. The top wall 30 and back wall 32 are approximately parallel, are spaced apart from each other, and are secured perpendicular to the side walls 20 and 22. The back wall 32 is secured perpendicularly to both the side walls 20 and 22 and secured perpendicularly to the top wall 30 and the bottom wall 28, forming the five (5) sided electrical box 12.

The electrical box 12 has a front opening 34 opposite the back wall 32. The front opening 34 faces outward from a building wall 26 when installed, as illustrated in FIG. 5.

Referring now to FIGS. 1 and 2, the bottom wall 28 is provided with an upwardly extending tab 36 located centrally on the bottom wall 28 and adjacent to the front opening 34. The top wall 30, likewise, is provided with an downwardly extending tab 38 located centrally on the top wall 30 and adjacent the front opening 34. Each tab 36 and 38 is provided with a central threaded opening, 40 and 42 respectively, for receiving bottom faceplate screw 44 and top faceplate screw 46, respectively, as will be more fully described hereafter.

The faceplate 14 is provided with a large central opening 48, a centrally located upper hole 50 provided in the faceplate 14 above the central opening 48 and a centrally located lower hole 52 provided in the faceplate 14 below the central opening 48.

Figure 4:
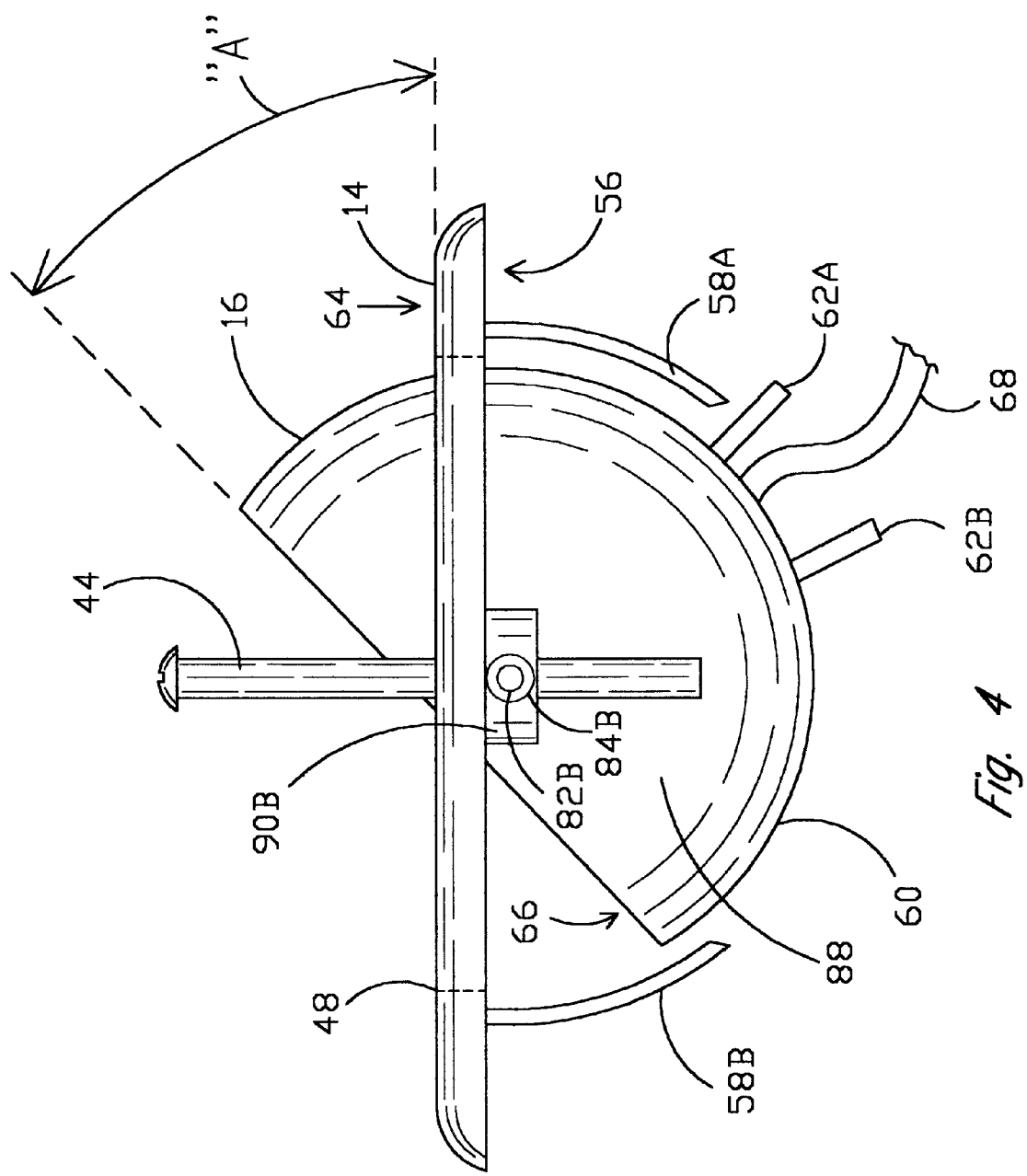
FIG. 4 is a bottom plan view of the faceplate and swivel portion of the swivel electrical receptacle FIG. 1.

The central opening 48 is slightly larger than the swivel portion 16 so that the swivel portion 16 can rotate or swivel along a vertical axis 54, illustrated in FIG. 2. The swivel portion 16 swivels along axis 54 located just behind the faceplate 14 and swings freely within the central opening 48, as shown in FIG. 4.

A reverse side 56 of the faceplate 14 is provided with two arcuate wings 58A and 58B extending rearward from the faceplate 14. The wings 58A and 58B serve to protect an arcuate rear side 60 of the swivel portion 16. The wings 58A and 58B also serve as a surface with which stops 62A and 62B can reversibly engage to limit maximum angle "A" of swivel between a front side 64 of the faceplate 14 and an outwardly provided face 66 of the swivel portion 16. The stops 62A and 62B are provided on the arcuate rear side 60 on either side of a centrally located flexible wire 68 which extends outward from the arcuate rear side 60 of the swivel portion 16.

The purpose of the stops 62A and 62B is to prevent damage to the flexible wire 68 by preventing it from being flexed excessively as the swivel portion 16 rotates and by preventing the flexible wire 68 from banging against the faceplate 14. The flexible wire 68 is preferably 3 strand braided flexible copper wire or a suitable substitute which is able to withstand frequent flexing resulting from movement of the swivel portion 16 along vertical axis 54. As illustrated in FIG. 5, internally within the swivel portion 16 one end of the 3 strand flexible wire 68 is electrically connected to slots 70A and 70B and prong openings 72 provided in the face 66 so that prong openings 72 are grounded and slots 70A and 70B are connected to an electrical current via an electrical house wire 74 connected to an opposite end of the flexible wire 68. The flexible wire 68 is connected to the electrical house wire 74 by means of standard wire connectors 76, such as the crimping connectors illustrated in FIG. 5 or other suitable wire connectors, such as, for example, screw type connectors. Alternately, the flexible wire 68 may be soldered to the electrical house wire 74 or otherwise suitable attached. As illustrated in FIG. 5, the electrical house wire 74 enters the electrical box 12 either via a wire hole 78 provided in the back wall 32 or by via an alternate wire hole 80 provided in the bottom wall 28.

The swivel portion 16 slips vertically between the arcuate wings 58A and 58B until the face 66 of the swivel portion 16 aligns within the central opening 48 of the faceplate 14. First ends 81A and 81B provided respectively on rods 82A and 82B then insert respectively into rod receiving openings 84A and 84B provided respectively in a top surface 86 of the swivel portion 16 and a bottom surface 88 of the swivel portion 16. The engagement between the first ends 81A and 81B and the receiving openings 84A and 84B provides sufficient clearance so that the first ends 81A and 81B are freely rotatable within receiving openings 84A and 84B. This is important as this allows the swivel portion 16 to rotate relative to the electrical box 12 and the faceplate 14, as will become clear hereafter.

Opposite second ends 90A and 90B on the respective rods 82A and 82B are each provided with eye openings 92A and 92B respectively, therein. Eyes opening 92A is then aligned with upper hole 50 and with threaded opening 42. Top faceplate screw 46 is then inserted from the front side 64 of the faceplate 14 consecutively through the upper hole 50, the eye opening 92A, and into the threaded opening 42 to secure the faceplate 14 and the associated swivel portion 16 over the front opening 34 of the electric box 12. Likewise, the eye opening 92B is aligned with lower hole 52 and with threaded opening 40. Bottom faceplate screw 44 is then inserted from the front side 64 of the faceplate 14 consecutively through the lower hole 52, the eye opening 92B and into the threaded opening 40 to secure the faceplate 14 and the associated swivel portion 16 over the front opening 34 of the electric box 12.

When the swivel electrical receptacle 10 is thus installed, the rods 82A and 82B are aligned along vertical axis 54 and the swivel portion 16 is free to rotate on the stationary rods 82A and 82B.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A swivel electrical receptacle comprising:

a wall mounted electrical receptacle box, a swivel portion movably secured within the box, a face provided on the swivel portion, said face provided with slots for removably receiving prongs of an electrical plug, said swivel portion swiveling in response to a pulling force applied to said electrical plug when the plug is engaged with the slots to align the face perpendicular to the pulling force exerted on the electrical plug.

2. The swivel electrical receptacle according to claim 1 wherein said swivel portion swivels along a vertical axis.

3. The swivel electrical receptacle according to claim 1 further comprising;

a stationary faceplate being removably secured to said electrical receptacle box, and said faceplate being provided with a central opening through which extends said face of said swivel portion.

4. The swivel electrical receptacle according to claim 1 further comprising:

an electrical connection between said swivel portion and a source of electricity.

* * * * *